US012562536B2

(12) United States Patent
Di Vita et al.

(10) Patent No.: US 12,562,536 B2
(45) Date of Patent: Feb. 24, 2026

(54) GROUND FAULT CIRCUIT INTERRUPTERS AND CONNECTORS FOR USE WITH SAME

(71) Applicant: Hubbell Incorporated, Shelton, CT (US)

(72) Inventors: Antonio Di Vita, Shelton, CT (US); Michael Nagy, Fairfield, CT (US); Kenny Padro, Hamden, CT (US)

(73) Assignee: Hubbell Incorporated, Shelton, CT (US)

( * ) Notice: Subject to any disclaimer, the term of this patent is extended or adjusted under 35 U.S.C. 154(b) by 208 days.

(21) Appl. No.: 18/360,435

(22) Filed: Jul. 27, 2023

(65) Prior Publication Data

US 2023/0369811 A1    Nov. 16, 2023

Related U.S. Application Data

(63) Continuation of application No. 17/154,412, filed on Jan. 21, 2021, now Pat. No. 11,728,595.

(60) Provisional application No. 62/964,307, filed on Jan. 22, 2020.

(51) Int. Cl.
| | |
|---|---|
| *H01R 13/713* | (2006.01) |
| *H01H 71/12* | (2006.01) |
| *H01R 24/78* | (2011.01) |
| *H01R 25/00* | (2006.01) |
| *H02H 3/16* | (2006.01) |

(52) U.S. Cl.
CPC ......... *H01R 13/7135* (2013.01); *H01H 71/12* (2013.01); *H01R 24/78* (2013.01); *H01R 25/006* (2013.01); *H02H 3/16* (2013.01)

(58) Field of Classification Search
CPC ............ H01R 13/7135; H01R 13/6658; H01R 4/4818; H01R 13/6271; H01R 13/648; H01R 13/652; H01R 24/62; H01R 13/60; H02H 3/16; H01H 71/121; H01H 83/14; H01H 83/144
USPC ...................................................... 361/42–50
See application file for complete search history.

(56) References Cited

U.S. PATENT DOCUMENTS

| | | | |
|---|---|---|---|
| 3,120,985 A | 2/1964 | Hubbell | |
| 6,433,555 B1 * | 8/2002 | Leopold ................. | H01H 83/04 |
| | | | 324/509 |
| 7,736,175 B1 | 6/2010 | Savicki, Jr. et al. | |
| 2005/0212646 A1 | 9/2005 | Watchorn et al. | |
| 2010/0029126 A1 | 2/2010 | Ngo | |

(Continued)

OTHER PUBLICATIONS

Extended European Search Report dated Jan. 16, 2024 for corresponding European Application No. 21744174.0.

(Continued)

*Primary Examiner* — Danny Nguyen
(74) *Attorney, Agent, or Firm* — Michael Best & Friedrich LLP

(57) ABSTRACT

A connector for use with a GFCI receptacle is provided. The connector includes a body, a latch configured to couple the body to the GFCI receptacle, a first blade supported by and extending from the body, a second blade supported by and extending from the body, wherein when the body is coupled to the GFCI receptacle, the first blade is received by a first mating terminal of the GFCI receptacle and the second blade is received by a second mating terminal of the GFCI receptacle to electrically couple the receptacle to a downstream device.

26 Claims, 14 Drawing Sheets

(56)         References Cited

U.S. PATENT DOCUMENTS

| | | |
|---|---|---|
| 2010/0304624 A1 | 12/2010 | Montalbano et al. |
| 2012/0188667 A1* | 7/2012 | Padro ..................... H01H 83/02 |
| | | 361/42 |
| 2013/0215542 A1 | 8/2013 | Benoit et al. |
| 2016/0020597 A1 | 1/2016 | Bonasia et al. |
| 2016/0226172 A1 | 8/2016 | Toyoda et al. |

OTHER PUBLICATIONS

PCT/US2021/014341 International Search Report and Written Opinion dated May 25, 2021 (18 pages).
Chinese Patent Application No. 202180023273.6 First Office Action Issued by the China National Intellectual Property Administration dated May 29, 2025 (with Translation).

\* cited by examiner

GROUND FAULT CIRCUIT INTERRUPTERS AND CONNECTORS FOR USE WITH SAME

CROSS-REFERENCE TO RELATED APPLICATIONS

This application is a continuation of U.S. patent application Ser. No. 17/154,412, filed on Jan. 21, 2021, which claims priority to U.S. Provisional Patent Application No. 62/964,307, filed on Jan. 22, 2020, the entire contents of each of which are hereby incorporated by reference.

FIELD

Embodiments relate to switched electrical devices.

SUMMARY

Switched electrical devices, such as but not limited to circuit interrupting device (for example, ground fault circuit interrupters (GFCI) and/or arc fault circuit interrupters (AFCI)) are configured to switch to a "tripped" or unlatched state from a "reset" or latched state when one or more conditions are detected.

In one embodiment, a receptacle includes a housing enclosing a circuit interrupting device. The housing includes a front cover having a duplex outlet face and a rear cover having a first aperture adjacent a first end and a pair of apertures adjacent a second end. The receptacle further includes a first set of terminals positioned within the housing and accessible through duplex outlet face, a second set of terminals positioned within the housing and accessible through the duplex face, a third set of terminals positioned within the housing and accessible through the first aperture, and a fourth set of terminals positioned within the housing, each of the fourth set of terminals being accessible through one of the pair of apertures. A first connector is removably coupleable to the receptacle to selectively couple electric power to the receptacle. The first connector includes terminals that are complementary to and electrically and physically coupleable to one of each of the third set of terminals. A second connector is removably coupleable to the receptacle to selectively electrically couple the receptacle to one or more downstream devices. The first connector includes terminals that are complementary to and electrically and physically coupleable to one of each of the fourth set of terminals.

In another embodiment, a connector is provided for selectively electrically coupling a GFCI receptacle to one or more downstream devices. The connector includes a body, a pair of L-shaped blades configured to be received by female terminals positioned within the GFCI receptacle, and a pair of latch mechanisms positioned on opposite sides of the body that are configured to couple the body to GFCI receptacle.

In another embodiment, a connector for use with a GFCI receptacle is provided. The connector includes a body, a latch configured to couple the body to the GFCI receptacle, a first blade supported by and extending from the body, a second blade supported by and extending from the body, wherein when the body is coupled to the GFCI receptacle, the first blade is received by a first mating terminal of the GFCI receptacle and the second blade is received by a second mating terminal of the GFCI receptacle to electrically couple the receptacle to a downstream device.

In another embodiment, a receptacle includes a housing enclosing a circuit interrupting device. The housing includes a front cover having a duplex outlet face and a rear cover, the rear cover having a first aperture and a second aperture. The receptacle includes one or more first sets of terminals positioned within the housing and accessible through duplex outlet face, a second set of terminals positioned within the housing and configured to input electrical power to the receptacle from a power source, a third set of terminals positioned within the housing. The third set of terminals are configured to provide ground fault protection to a downstream device, and the third set of terminals includes a first terminal that is accessible through the first aperture and a second terminal that is accessible through the second aperture.

In another embodiment, a receptacle assembly including a housing enclosing a circuit interrupting device. The housing includes a front cover having a duplex outlet face and a rear cover. The rear cover has a first aperture and a second aperture. The receptacle includes one or more first sets of terminals positioned within the housing and accessible through duplex outlet face, a second set of terminals positioned within the housing and configured to input electrical power to the receptacle from a power source, a third set of terminals positioned within the housing. The third set of terminals is configured to provide ground fault protection to a downstream device, and the third set of terminals includes a first terminal that is accessible through the first aperture and a second terminal that is accessible through the second aperture. A is connector removably coupleable to the housing to electrically couple the receptacle to one or more downstream devices. The connector includes a first terminal and a second terminal. The first terminal is complementary to one of the first and second terminals of the third set of terminals and the second terminal is complementary to the other of the first and second terminals of the third set of terminals.

Other aspects of embodiments detailed below will become apparent by consideration of the detailed description and accompanying drawings.

DETAILED DESCRIPTION

Before any embodiments are explained in detail, it is to be understood that the application is not limited in its application to the details of construction and the arrangement of components set forth in the following description or illustrated in the following drawings. Other embodiments, than those described below, are capable of being practiced or of being carried out in various ways.

Figure 1:
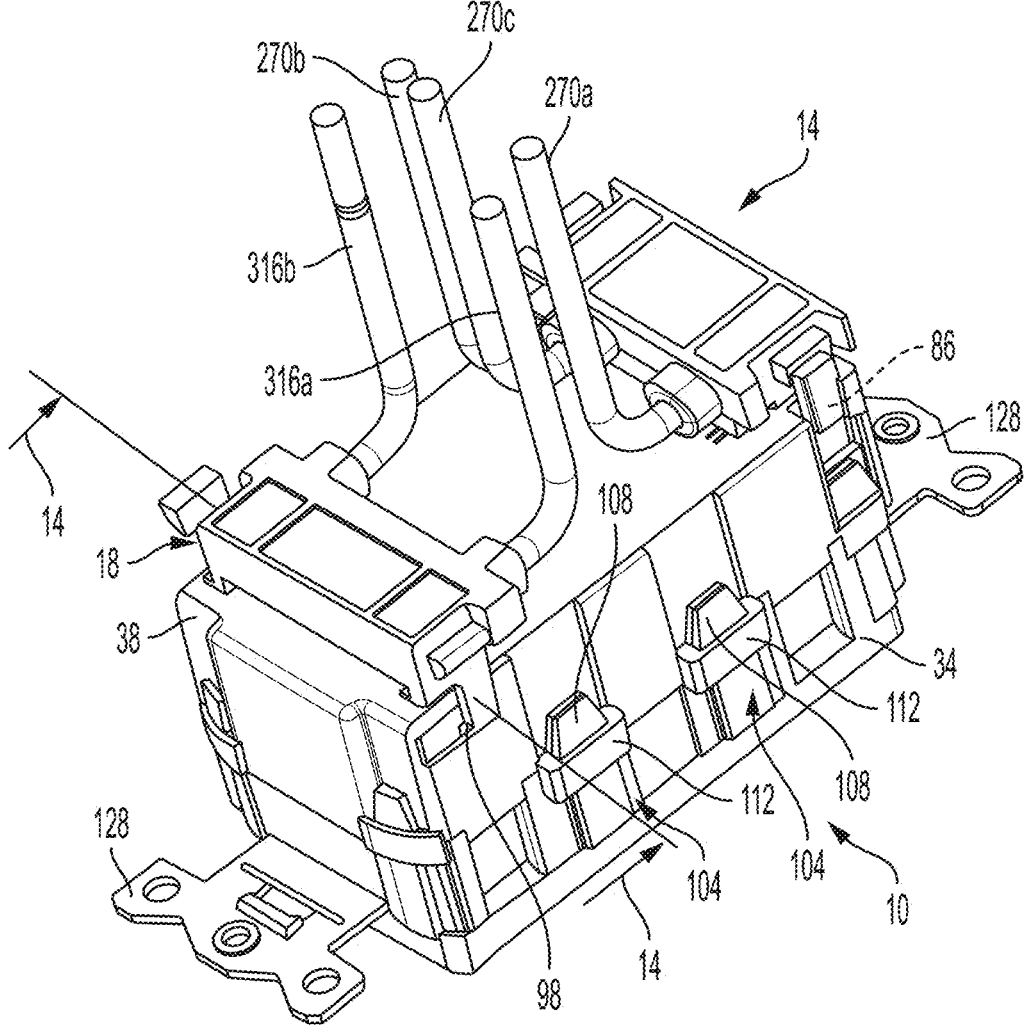
FIG. 1 is a perspective view of a receptacle including a first connector and a second connector coupled thereto according to one embodiment.

FIG. 1 is a rear perspective view of a receptacle 10, a first connector 14 (e.g., line connector, upstream connector), and a second connector 18 (e.g., load connector, downstream connector). The first and second connectors 14, 18 are coupleable to the receptacle 10.

Figure 2:
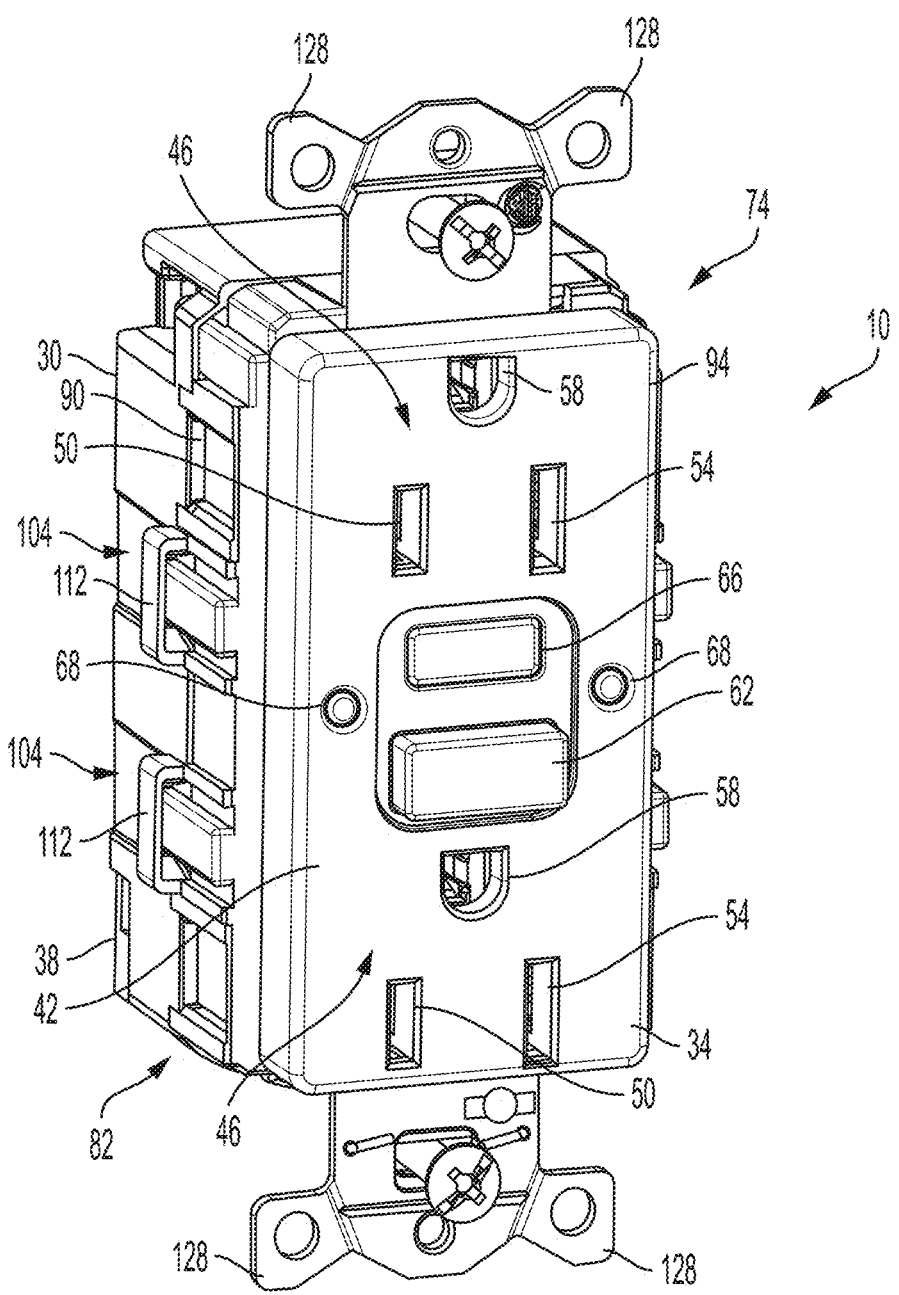
FIG. 2 is a front perspective view of the receptacle of FIG. 1.
Figure 3:
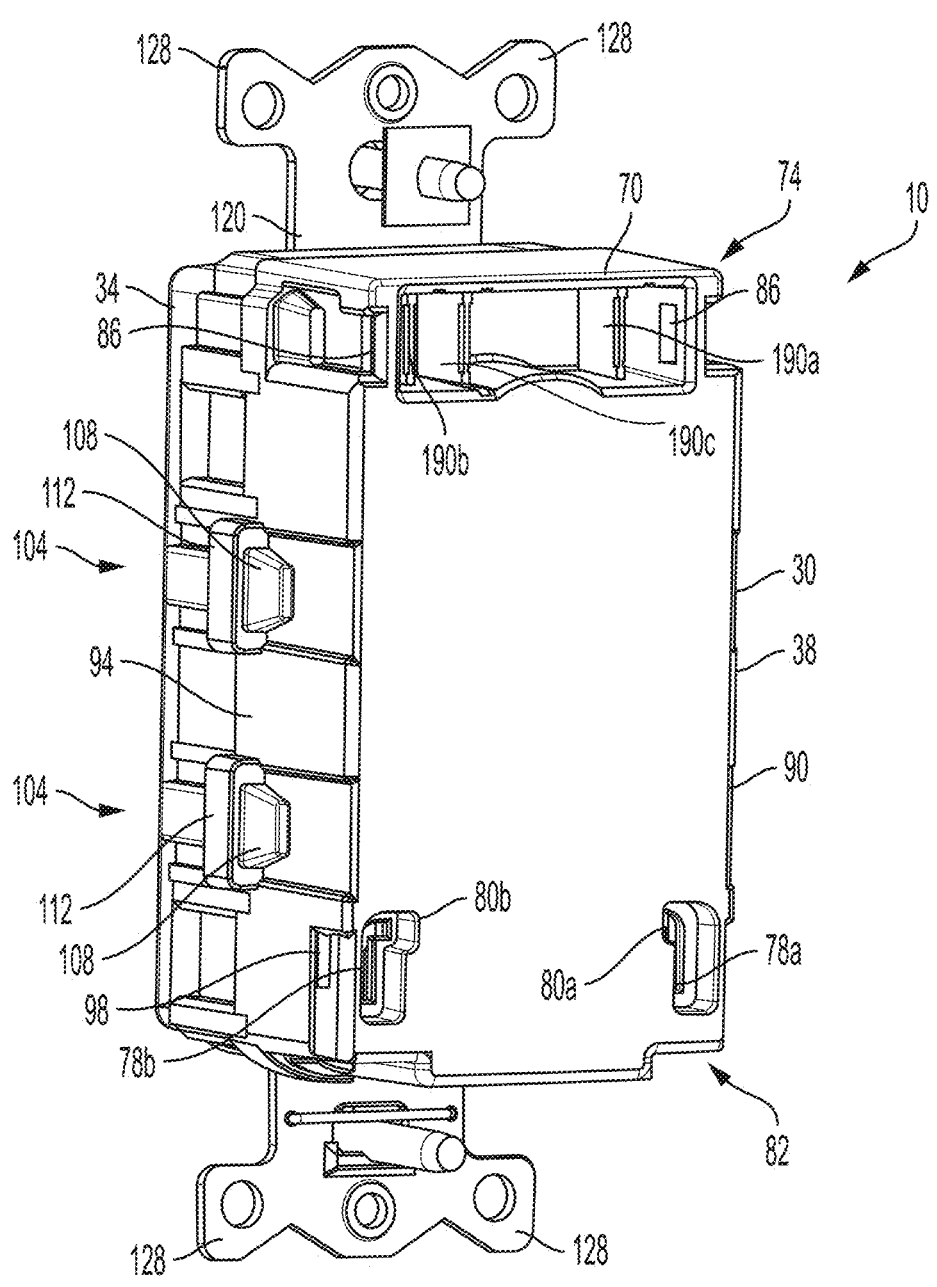
FIG. 3 is a rear perspective view of the receptacle of FIG. 1.
Figure 4:
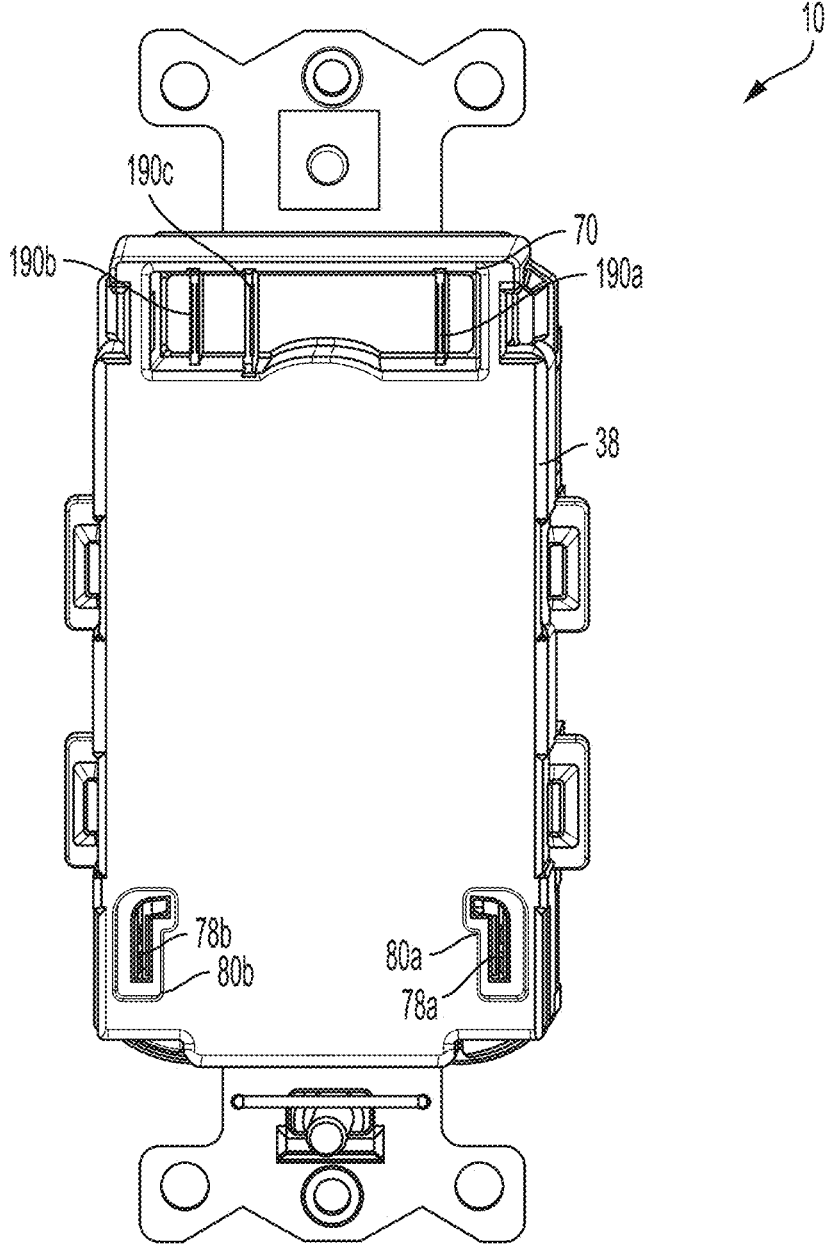
FIG. 4 is a rear view of the receptacle of FIG. 1.

With respect to FIGS. 2-4, the receptacle 10 includes a circuit interrupting device according to some embodiments. The receptacle 10 includes a housing 30 having a front cover 34 and a rear cover 38. The housing 30 may be formed of plastic, or a similar material. The front cover 34 may include a duplex outlet face 42 with two sets of openings 46, each having a hot phase opening 50, a neutral opening 54, and a ground opening 58. The face 42 may further include openings accommodating a RESET button 62, a TEST button 66, and one or more light emitting diodes 68 (LEDs). Although not illustrated, in some embodiments, the face 42 may include additional openings to accommodate additional buttons, as well as additional openings to accommodate various indicators (for example, buzzers, night lights etc.). With respect to at least FIG. 3, the rear cover 38 includes a first aperture 70 adjacent a first end 74 and a pair of apertures 78a, 78b adjacent a second, opposite end 82. The pair of apertures 78a, 78b in the rear cover 38 are substantially L-shaped and are sized and shaped such that a standard wire is too large to be inserted therein. The pair of apertures 78a, 78b are each positioned within a similarly shaped L-shaped recess 80a, 80b. As shown, each of the apertures 78a, 78b and the pair of recesses 80a, 80b have a substantially 90 degree bend between a first end and a second end thereof. The rear cover 38 also includes a first pair of apertures or pockets 86 that extend through opposite side 90, 94 of the rear cover 38 and a second pair of apertures or pockets 98 that extend through the opposite sides 90, 94 of the rear cover 38. The first pair of pockets 86 is positioned is adjacent the first end 74 and the second pair of pockets 98 are adjacent the second end 82.

With respect to FIGS. 1-3, the rear cover 38 is secured to front cover 34 by fasteners 104. For example, each fastener 104 may include a barbed post 108 on front cover 34 and corresponding resilient hoop 112 on rear cover 38, similar to that which is described in detail in U.S. Pat. No. 6,398,594, the entire contents of which are incorporated herein by reference for all that is taught. In the illustrated embodiment, there are eight fasteners, although more or less than eight fasteners can be used in other embodiments.

Figure 5:
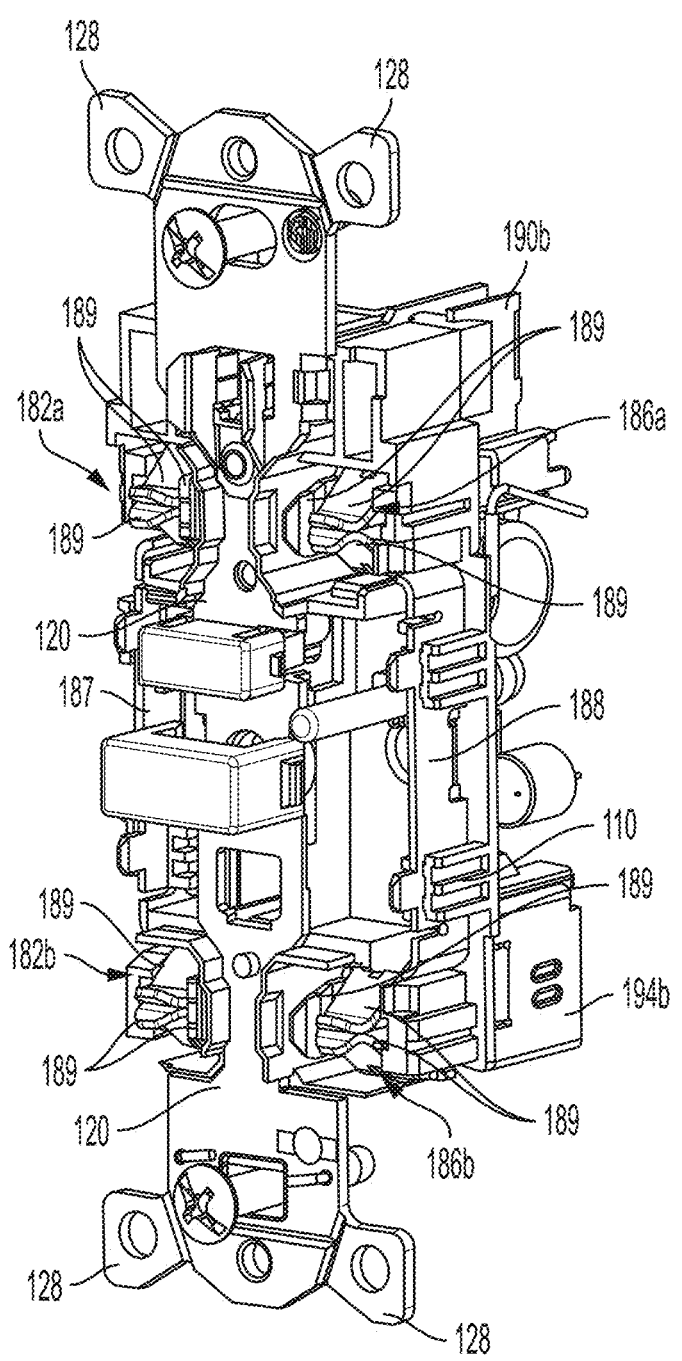
FIG. 5 is a front perspective view of the receptacle of FIG. 1 with front and rear covers removed.
Figure 6:
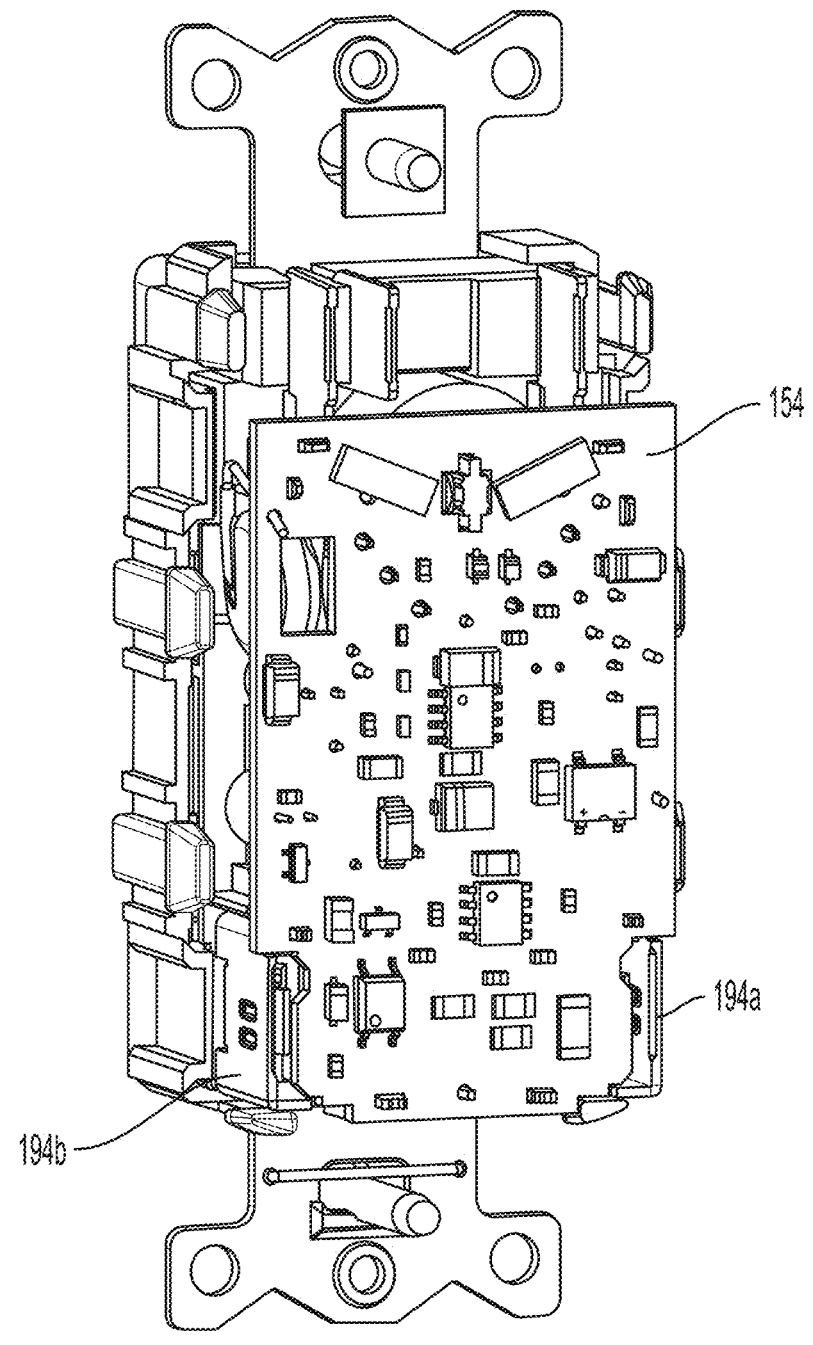
FIG. 6 is a rear perspective view of the receptacle of FIG. 1 with the front and rear covers removed.

As shown in FIG. 5, contained within the front and rear covers 34, 38 is a manifold or barrier 110 that provides support for a yoke/bridge assembly 120 configured to secure the receptacle 10 to an electrical box (not shown). The ground yoke/bridge assembly 120 has standard mounting ears 128 that protrude from the ends 74, 82 of receptacle 10.

FIGS. 6-8B illustrate perspective views of a core assembly 150 (FIG. 8B) according to some embodiments. The core assembly 150 is configured to support a printed circuit board 154 that supports most of the working components of the receptacle 10, including the control system. A first conductor arm 158a and a second conductor arm 158b are in communication with the printed circuit board 154 and configured to supply electrical power to the receptacle 10 and to downstream receptacles. The first conductor arm 158a is the hot line conductor and the second conductor arm 158b is the neutral line conductor. The first conductor arm 158a has a hot line contact 160 and a hot load contact 161, and the second conductor arm 158b includes a neutral line contact 162 and a neutral load contact 163. The core assembly 150 may additionally support a coil 166 having an aperture 170. In the illustrated embodiment, the aperture 170 is configured to receive a portion of both the first and second conductor arms 158a, 158b.

Figure 7:
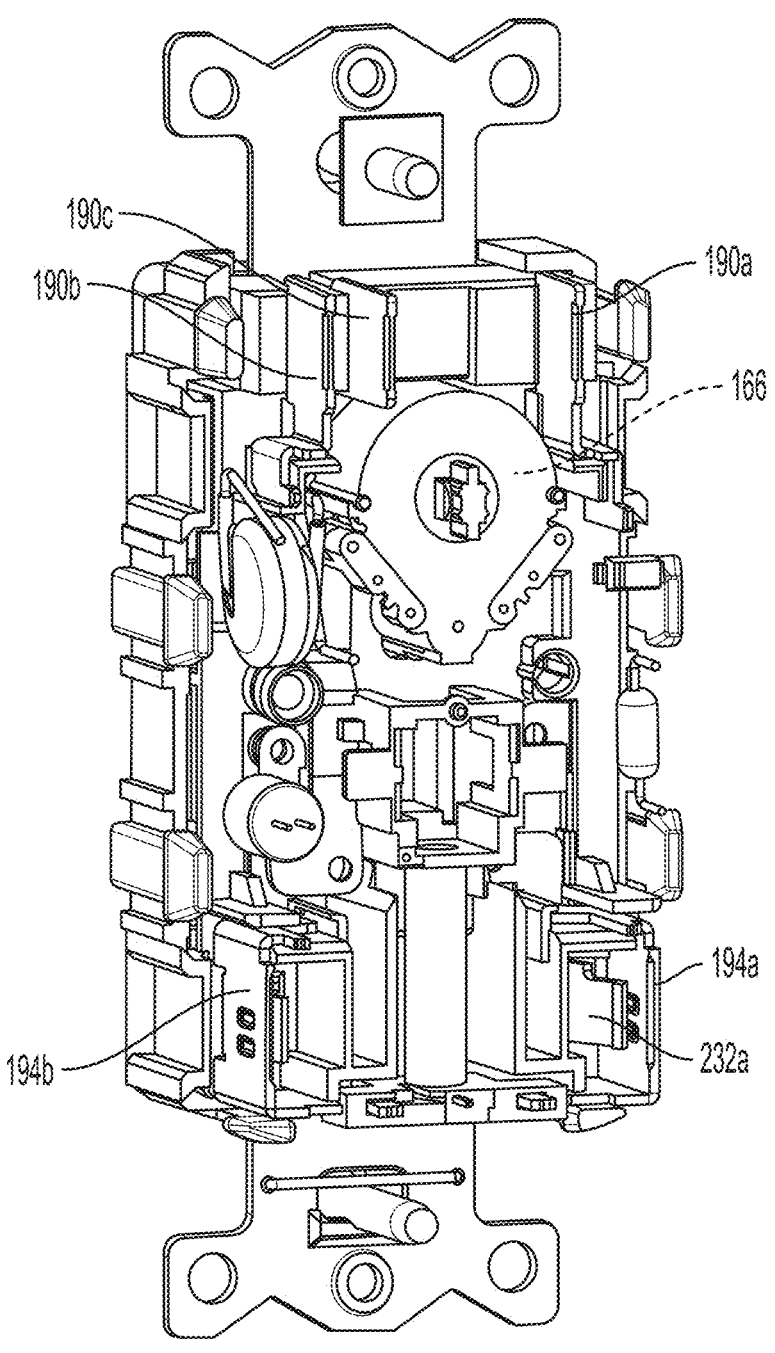
FIG. 7 is a rear perspective view of a core assembly of the receptacle of FIG. 1.
Figure 8A:
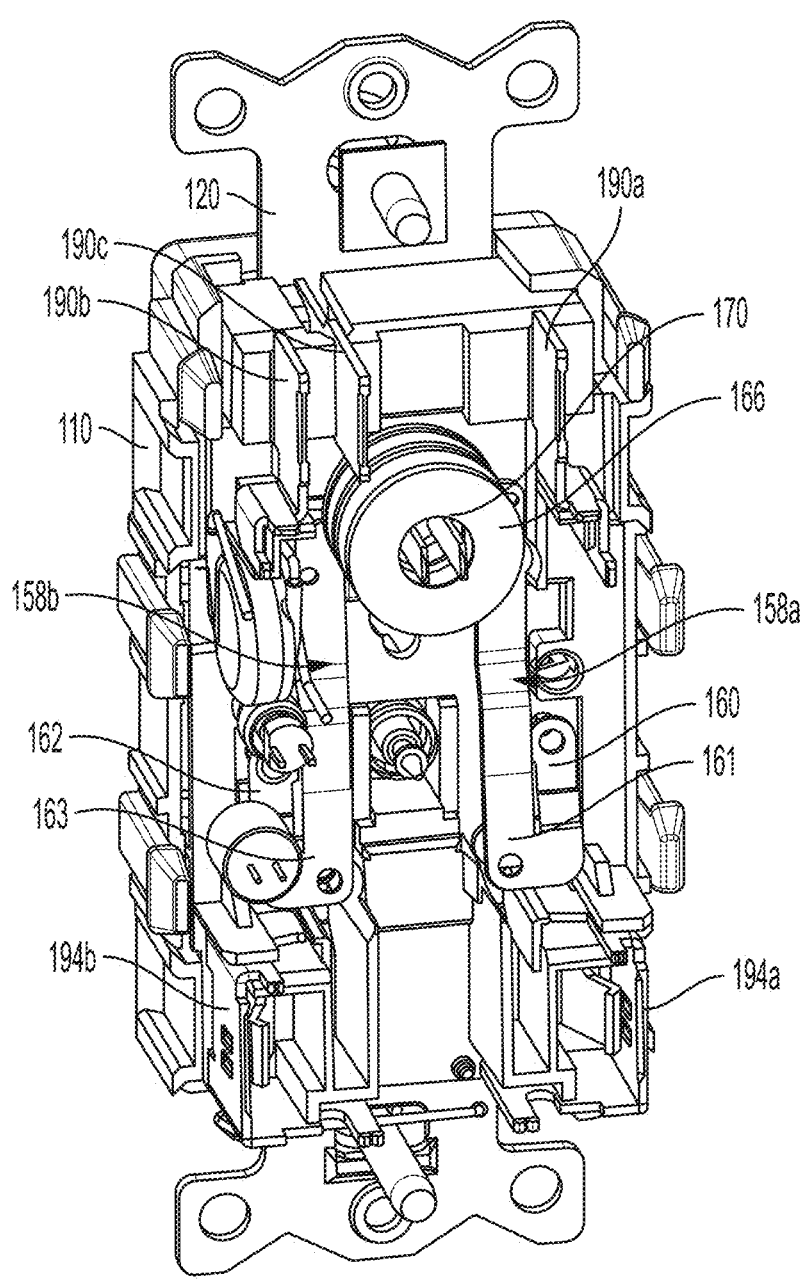
FIG. 8A is another rear perspective view of the receptacle of FIG. 1 with the rear cover and a printed circuit board removed.
Figure 8B:
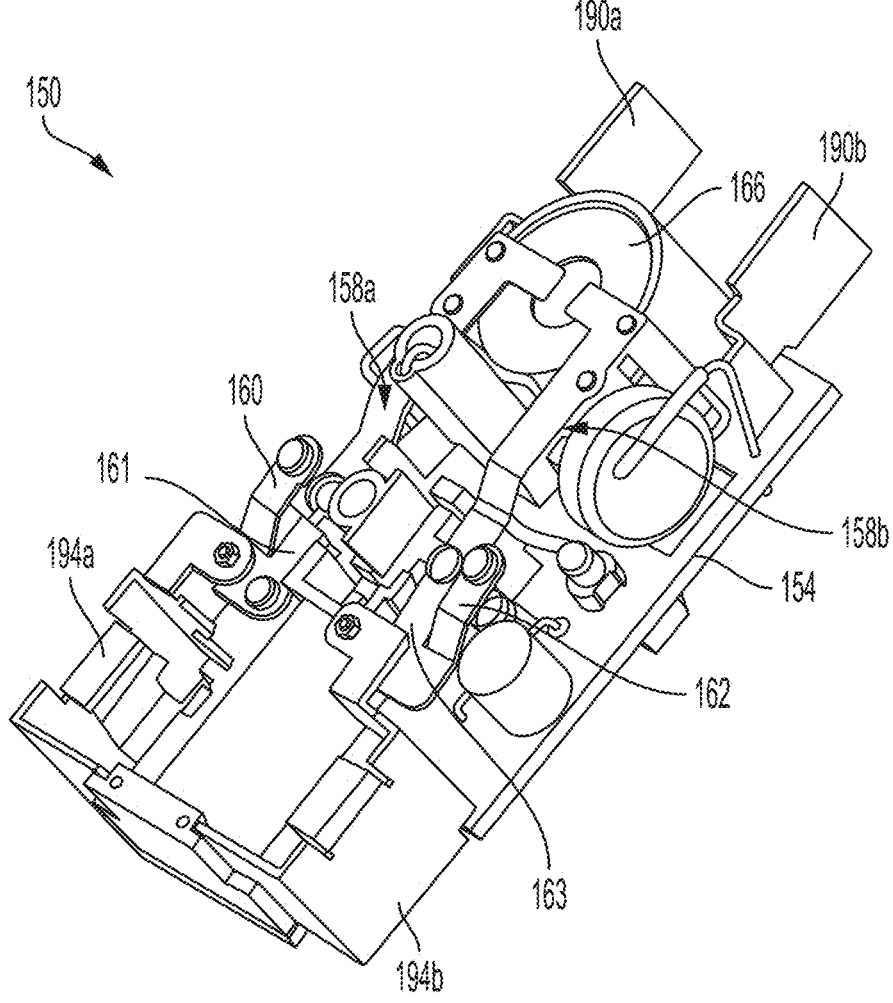
FIG. 8B is a front perspective view of a core assembly of the receptacle of FIG. 1.

The barrier 110 furthers supports a plurality of terminals. The term terminal, as used herein, means a component that conducts current to or from an electric circuit. The plurality of terminals includes a first set of terminals 182a, 186a (FIG. 5) and a second set of terminals 182b, 186b (FIG. 5) are on opposite sides of the barrier 110 (and therefore the receptacle 10) from a third set of terminals 190a, 190b, 190c (FIGS. 7 and 8) and a fourth set of terminals 194a, 194b (FIGS. 7 and 8).

Each of the first and second sets of terminals 182a, 186a, 186a, 186b are output line face terminals and include a hot line face terminal 182a, 186a and a neutral line face terminal 182b, 186b. In particular, the hot line face terminals 182a, 186a are integrally formed with (or otherwise coupled to) and extend from a hot face contact 187 and the neutral line face terminals 182b, 186b are integrally formed with (or otherwise coupled to) and extend from a neutral face contact 188. As shown in FIG. 5, each of the first and second sets terminals are female terminals that are formed from two or more beams 189. The first set of terminals 182a, 182b and the second sets of face terminal 186a, 186b are, respectively, configured to receive the mating male terminals of a plug of a device (not shown) and output electric power to the device. The hot line contact 160 and neutral line contact 162 are cantilevered and in selective electrical and physical communication with the respective hot face contact 187 and the neutral face contact 188.

The third set of terminals 190a, 190b, 190c are input blade (e.g., male) terminals that are accessible through the first aperture 70. The third set of terminals 190a, 190b, 190c include a hot line terminal 190a, a neutral line terminal 190b, and a ground terminal 190c. The line terminal 190a and the neutral terminal 190b are in electrical communication (e.g., via the printed circuit board 154) with the respective line and load conductor arms 158a, 158b. Each of the third set of terminals 190a, 190b, 190c are in electrical communication with the printed circuit board 154 and configured to input electrical power for a power source to the receptacle from a power source, as will be discussed in greater detail below.

Figure 9:
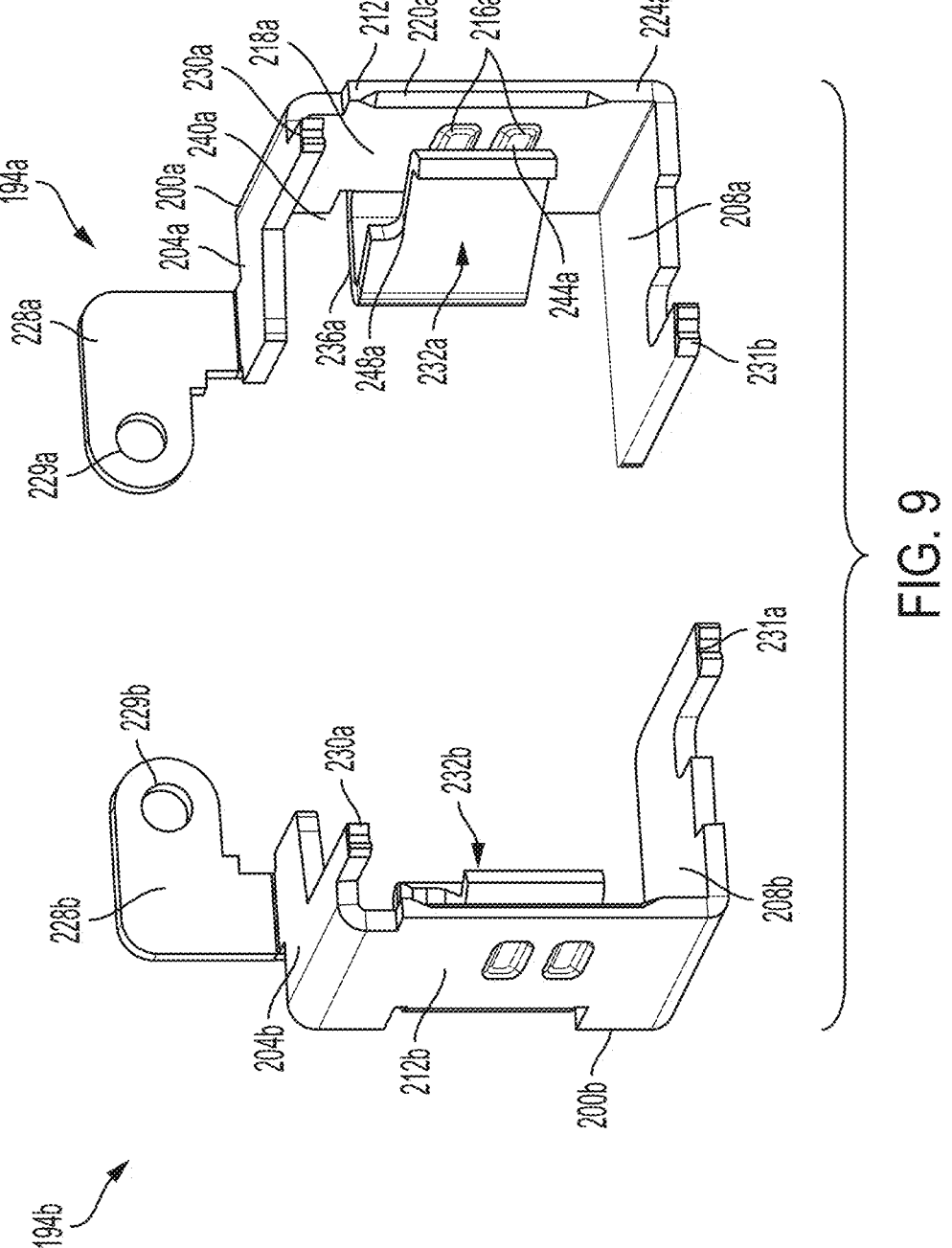
FIG. 9 is a perspective view of terminals of the receptacle of FIG. 1.
Figure 10:
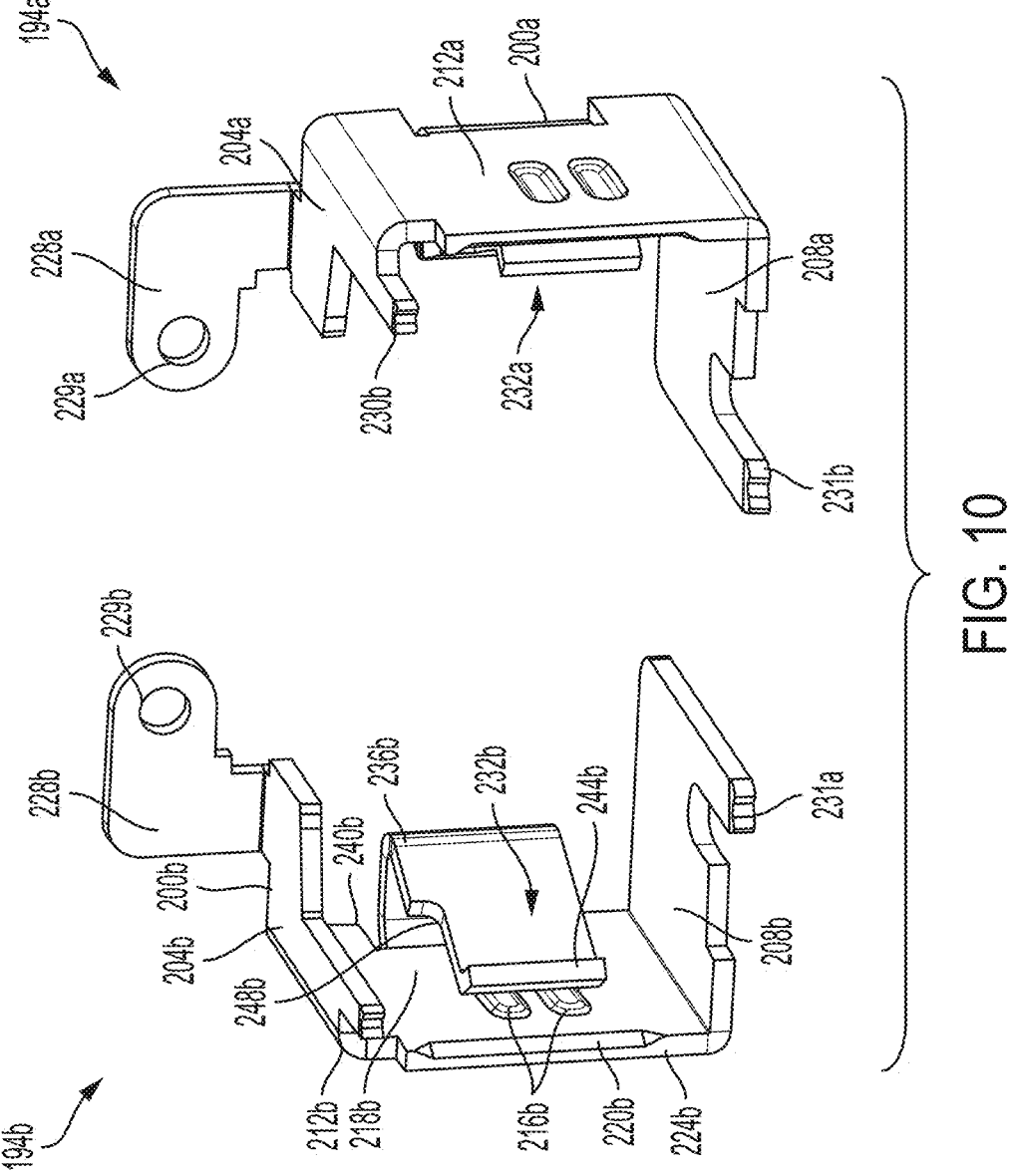
FIG. 10 is another perspective view of terminals of the receptacle of FIG. 9.

The fourth set of terminals 194a, 194b are output load terminals and are accessible through respective apertures 78a, 78b in the rear cover 38. The fourth set of terminals are configured to provide ground fault protection to one or more downstream devices, as will be discussed in greater detail below. The fourth set of terminals 194a, 194b include a hot load terminal 194a and a neutral load terminal 194b. The hot load contact 161 and neutral load contact 163 are cantilevered and in selective electrical and physical communication with the respective hot load terminal 194*a* and neutral load terminal 194*b*. With respect to FIGS. 9 and 10, the fourth set of terminals 194*a*, 194*b* are positioned on opposite sides of the core assembly 150 and are in electrical communication with the printed circuit board 154. The hot load terminal 194*a* and the neutral load terminal 194*b* are mirror images of one another, and therefore include the same features, although only the hot load terminal 194*a* is described in detail herein.

The hot load terminal 194*a* includes a body 200*a* that has a first portion 204*a* and a second portion 208*a* positioned on and integrally coupled with a central portion 212*a*. The central portion 212*a* includes gussets 216*a* on one surface 218*a* and a recess or chamfered edge 220*a* that extends along a first edge 224*a* (e.g., distal edge). Terminal arms 228*a* are coupled to and extend from the first portion 204*a* and include an aperture 229*a* for mounting and electrically coupling the hot load contact 161 thereto. First and second legs 230*a*, 231*a* that extend respectively from the first and second portions 204*a*, 204*b* electrically couple the hot load terminal 194*a* to the printed circuit board 154. A beam configured as a biasing member 232*a* (e.g., spring) is coupled to the body 200*a*. In particular, the beam 232*a* includes a first end 236*a* that is coupled to and extends from a second edge 240*a* (e.g., proximal edge) of the central portion 212*a* of the body 200*a* and a second end 244*a* that is positioned adjacent the surface 218*a*. The beam 232*a* is biased towards the surface 218*a*. The beam 232*a* further includes a cut-out 248*a* on one edge. The beam 232*a* and the surface 218*a* of the central portion 212*a* defines a female terminal. The cut-out 248*a* is positioned adjacent to the bend between a first end and a second end of the first aperture 78*a*.

With respect to FIG. 1, the first connector 14 is coupled (e.g., by a snap fit connection) the receptacle 10 and the second connector 18 is coupled (e.g., by a snap fit connection) to the receptacle 10.

Figure 11:
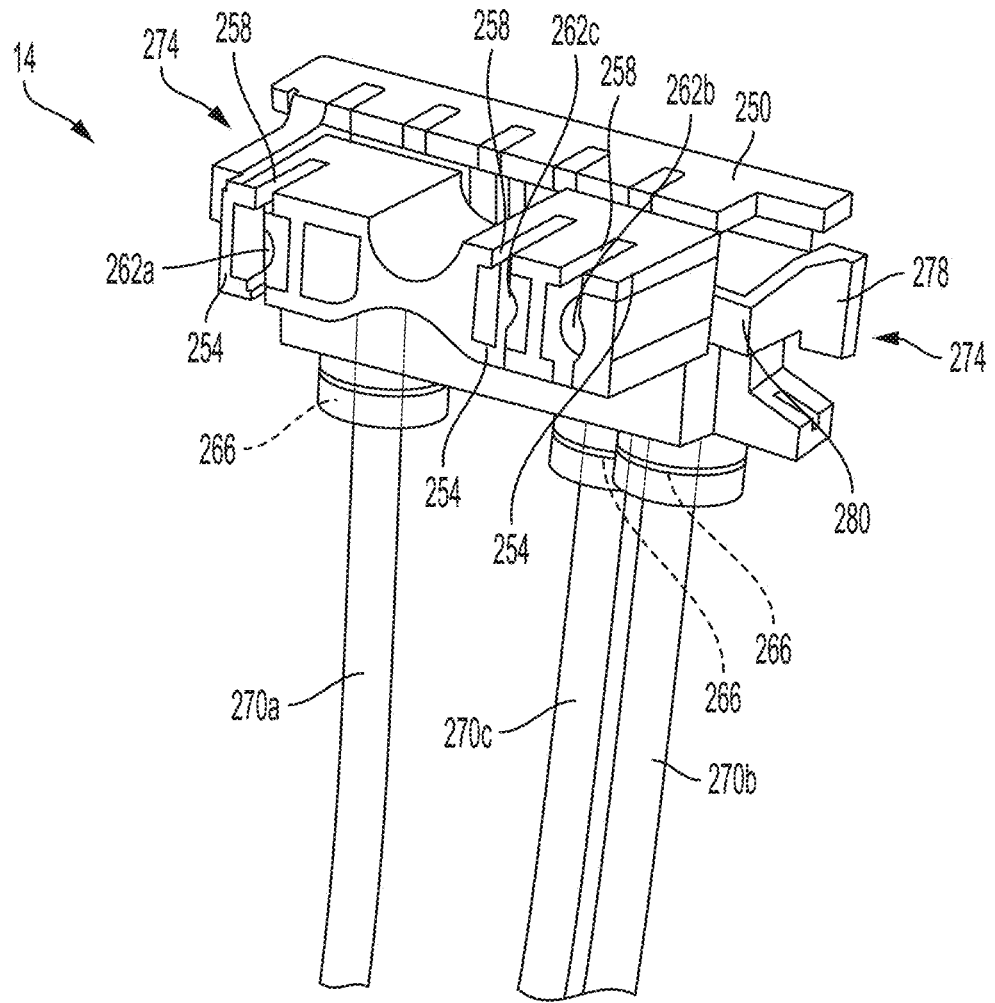
FIG. 11 is a perspective view of the first connector of FIG. 1.
Figure 12:
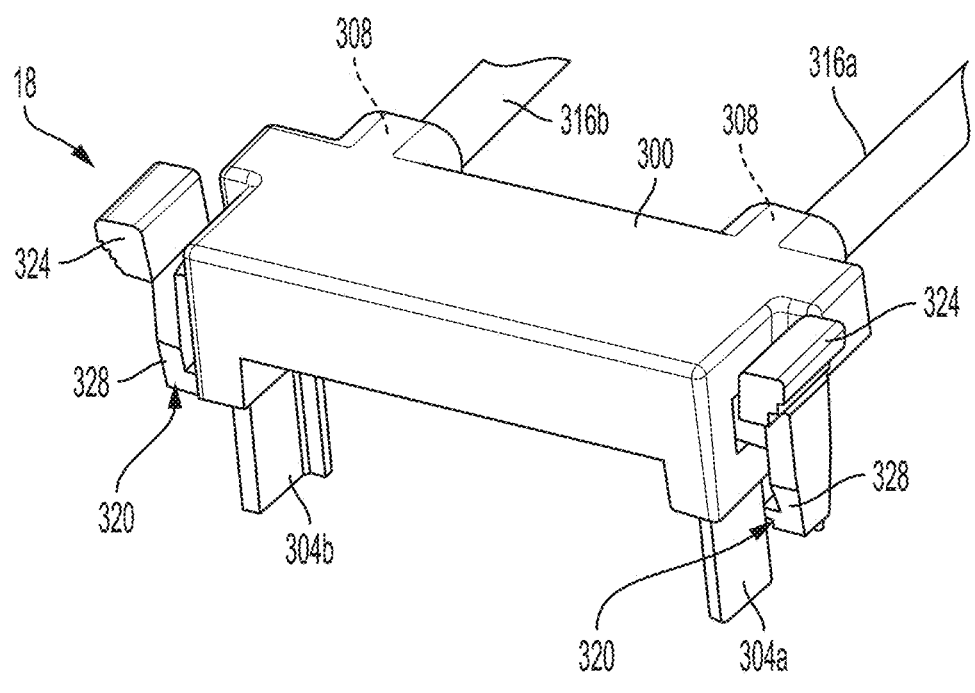
FIG. 12 is a perspective view of the second connector of FIG. 1.
Figure 13:
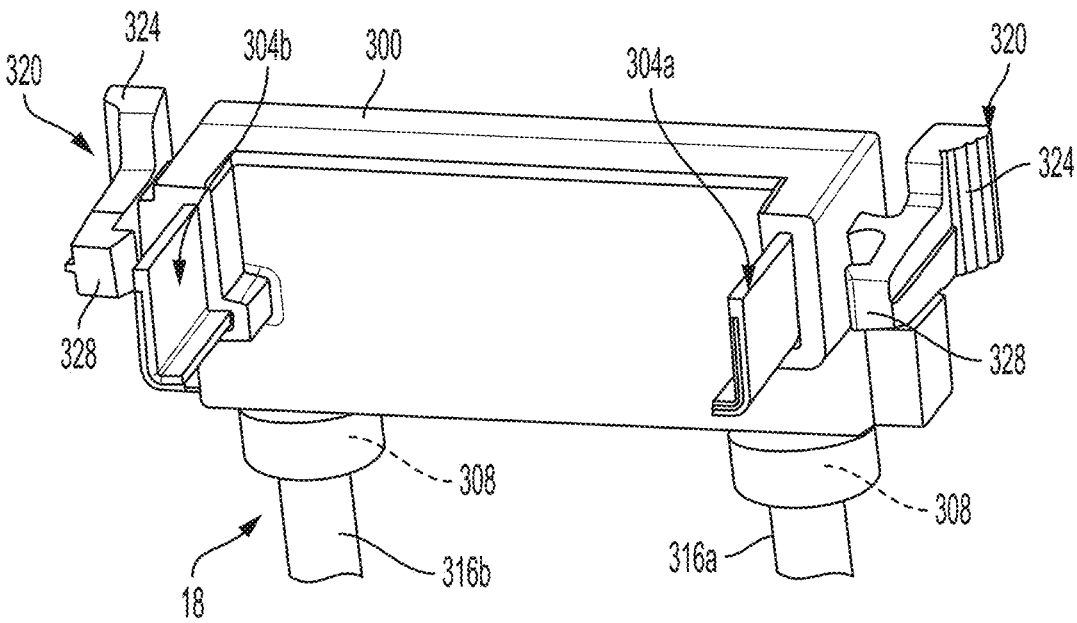
FIG. 13 is another perspective view of the second connector of FIG. 1.
Figure 14:
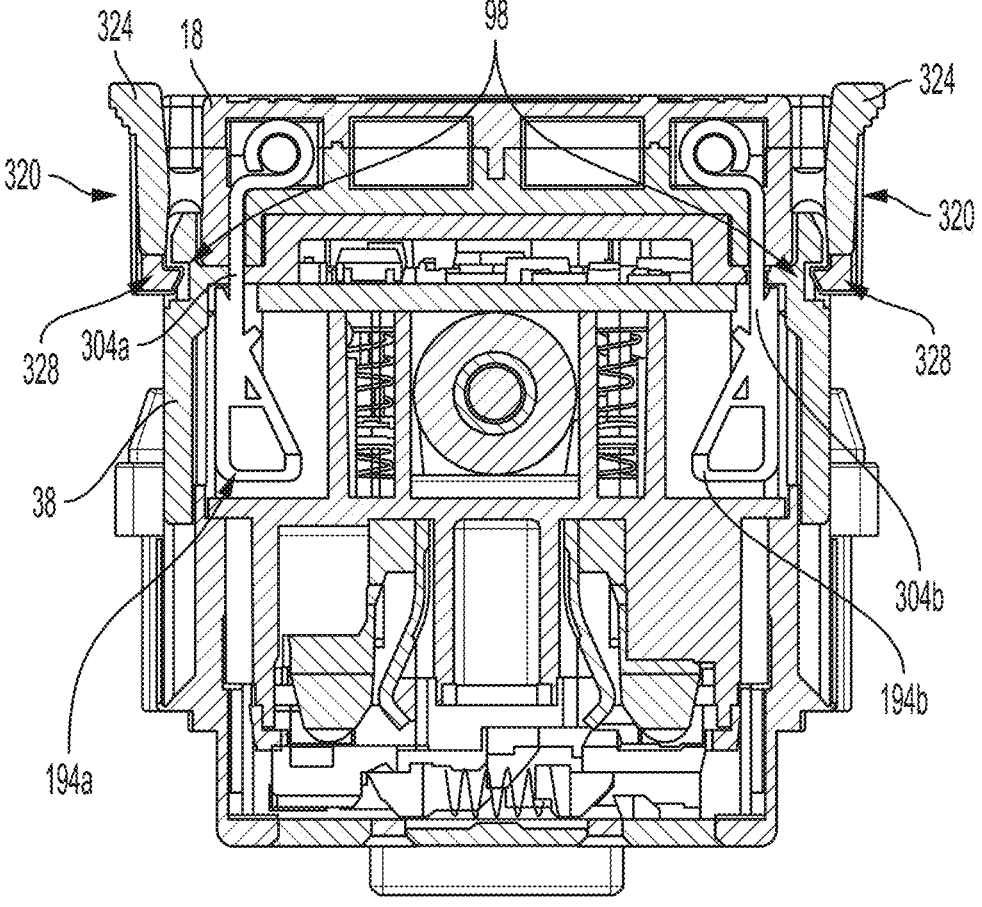
FIG. 14 is a cross-sectional view of the receptacle and second connector of FIG. 1 along the line 14-14 of FIG. 1.

The first connector 14 is shown in FIGS. 1 and 11. The first connector 14 includes a body 250 from which a plurality of projections 254 extend. Each of the projections 254 has a channel 258 that provides access to a female terminal positioned therein. Accordingly, there are three female terminals 262*a*, 262*b*, 262*c* (only a portion of each is shown). The female terminals 262*a*, 262*b*, 262*c* include a hot line terminal 262*a*, a neutral line terminal 262*b* and a ground terminal 262*c*. The body 250 further includes a plurality of apertures 266 that each receive a wire. One of the apertures 266 receives a hot line wire 270*a*, one of the apertures 266 receives a neutral line wire 270*b*, and one of the apertures 266 receives a ground wire 270*c*. The hot line wire 270*a* is in electrical communication with the hot line terminal 262*a*, the neutral line wire 270*b* is in electrical communication with the neutral line terminal 262*b*, and the ground wire 270*c* is in electrical communication with the ground terminal 262*c*. A first latch 274 is positioned on a first side of the body 250, and a second latch 274 is positioned on a second, opposite side of the body 250. Each of the latches 274 includes an actuator 278 and a latch member 280.

The second connector is shown in FIGS. 1 and 12-14. The second connector 18 includes a body 300 from which male terminals or blade terminals 304*a*, 304*b* extend. In particular, the body 300 includes a first body portion 312*a* that receives a portion of the blade 304*a*, 304*b* and from which the blades 304*a*, 304*b* extend and a second portion 312*b* that is coupled (e.g., ultrasonically welded) to the first body portion 312*b*. The male terminals 304*a*, 304*b* are substantially L-shaped and include a hot load terminal 304*a* and a neutral load terminal 304*b*. As shown, each of the terminals

304*a*, 304*b* have a substantially 90 degree bend between a first end and a second end thereof. The body 300 further includes a pair of apertures 308 that each receive a wire 316. One of the apertures 308 receives a hot load wire 316*a* and one of the apertures 308 receives a neutral load wire 316*b*. The hot load wire 316*a* is in electrical communication with the hot load terminal 304*a* and the neutral load wire 316*b* is in electrical communication with the neutral load terminal 304*b*. A first latch 320 is positioned on a first side of the body 300, and a second latch 320 is positioned on a second, opposite side of the body 300. Each of the latches 320 includes an actuator 324 and a latch member 328.

The first connector 14 is removably coupleable to the receptacle 10. In particular, the female terminals 262*a*, 262*b*, 262*c* of the first connector 14 are each configured to receive the respective terminal of the third set of terminals 190*a*, 190*b*, 190*c*, and the latch member 280 of the latch mechanisms 274 are received in a respective pockets 86 in the sides 90, 94 of the rear cover 38. The first connector 14 couples electric power from a power source to the receptacle 10. The second connector 18 is also removably coupleable to the receptacle 10. In particular, the male L-shaped terminals 304*a*, 304*b* of the second connector 18 are configured to be inserted into the respective female terminals of the fourth set of terminals 194*a*, 194*b*. The recesses 220*a* facilitates lead in of the respective L-shaped terminals 304*a*, 304*b*. The L-shape of the terminals 304*a*, 304*b* and the respective aperture 78*a*, 78*b* create a key feature. That is, the apertures 78*a*, 78*b* will not receive any terminals, but only the terminals 304*a*, 304*b* having the proper L-shape of the connector 18. Accordingly, the L-shape of the apertures 78*a*, 78*b* ensures other connectors will not mistakenly be coupled to the receptacle. The cut-out 248*a*, 248*b* in the beamss 232*a*, 232*b* also accommodates the L-shape of the terminals 304*a*, 304*b*, and ensures that terminals 304*a*, 304*b* properly mate and electrically communicate with the respective load terminals 194*a*, 194*b*.

Further, the beams 232*a*, 232*b* and gussets 216*a*, 216*b* (which add contact pressure) ensure a proper electrical connection with the terminals 304*a*, 304*b* of the second connector 18. Also, the latch member 328 of the latch 320 are received in a respective pockets 98 in the sides 90, 94 of the rear cover 38. The second connector 18 couples the receptacle 10 to the downstream devices to provide ground fault protection to downstream devices. Notably, the first and second connectors 14, 18 are not interchangeable. To remove either the first connector 14 or the second connector 18 from the receptacle 10, the user depresses or actuates the actuator 378, 324 of each of the latch 274, 320 to pivot the latch member 280, 324 out of the respective pocket 86, 98 in the rear cover 38.

Although the disclosure has been described with reference to certain preferred aspects, variations and modifications exist within the scope and spirit of one or more independent aspects of the disclosure as described. Various features and advantages of the disclosure are set forth in the following claims.

What is claimed is:

1. A receptacle comprising:
   a housing enclosing a circuit interrupting device, the housing including a front cover and a rear cover, the rear cover having a first aperture and a second aperture;
   a first set of terminals positioned within the housing and configured to input electrical power to the receptacle from a power source;
   a second set of terminals positioned within the housing, the second set of terminals configured to provide ground fault protection to a downstream device, the second set of terminals including a first terminal being accessible through the first aperture and a second terminal being accessible through the second aperture, wherein the receptacle includes a core assembly positioned within the housing, the first terminal is positioned on a first side of the core assembly and the second terminal is positioned on a second side of the core assembly, wherein the first side is opposite the second side.

2. The receptacle of claim 1, wherein each of the first and second terminals is a female terminal including a body and a cut out on a first side of the body.

3. The receptacle of claim 1, wherein each of the first and second terminals is configured to receive an L-shaped terminal of a connector.

4. The receptacle of claim 1, wherein the first terminal is a hot load terminal and the second terminal is a neutral load terminal.

5. The receptacle of claim 1, wherein the first terminal includes a first terminal arm and the second terminal includes a second terminal arm.

6. The receptacle of claim 5, wherein the first terminal arm is configured to electrically couple the first terminal to a hot load contact and the second terminal arm is configured to electrically couple the second terminal to a neutral load contact.

7. A receptacle comprising:
a housing enclosing a circuit interrupting device, the housing including a front cover and a rear cover, the rear cover having a first aperture and a second aperture;
a first set of terminals positioned within the housing and configured to input electrical power to the receptacle from a power source;
a second set of terminals positioned within the housing, the second set of terminals configured to provide ground fault protection to a downstream device, the second set of terminals including a first terminal being accessible through the first aperture and a second terminal being accessible through the second aperture, wherein the first terminal includes a first terminal leg and the second terminal includes a second terminal leg.

8. The receptacle of claim 7, wherein the receptacle includes a printed circuit board, the first terminal leg is configured to electrically couple the first terminal to the printed circuit board and the second terminal leg is configured to electrically couple the second terminal to the printed circuit board.

9. The receptacle of claim 8, wherein the first set of terminals is in electrical communication with the printed circuit board.

10. A receptacle comprising:
a housing enclosing a circuit interrupting device, the housing including a front cover and a rear cover, the rear cover having a first aperture and a second aperture;
a first set of terminals positioned within the housing and configured to input electrical power to the receptacle from a power source;
a second set of terminals positioned within the housing, the second set of terminals configured to provide ground fault protection to a downstream device, the second set of terminals including a first terminal being accessible through the first aperture and a second terminal being accessible through the second aperture, wherein the front cover has a plurality of openings, and wherein the receptacle includes a third set of terminals positioned within the housing and accessible through the plurality of openings.

11. A receptacle assembly comprising:
a housing enclosing a circuit interrupting device, the housing including a front cover and a rear cover, the rear cover having a first aperture and a second aperture;
a first set of terminals positioned within the housing and configured to input electrical power to the receptacle from a power source;
a second set of terminals positioned within the housing, the second set of terminals configured to provide ground fault protection to a downstream device, the second set of terminals including a first terminal being accessible through the first aperture and a second terminal being accessible through the second aperture; and
a connector removably couplable to the housing to electrically couple the receptacle to a downstream device, the connector including a first terminal and a second terminal, the first terminal being complementary to one of the first and second terminals of the second set of terminals and the second terminal being complementary to the other of the first and second terminals of the second set of terminals.

12. The receptacle assembly of claim 11, wherein the connector includes a body and a latch configured to couple the body to the housing, each of the first terminal of the connector and the second terminal of the connector supported by and extending from the body.

13. The connector of claim 12, wherein each of the first and second terminals of the connector are L-shaped.

14. The connector of claim 12, wherein each of the first and second terminals of the connector are input terminals including a first end, a second end, and a bend between the first end and the second end.

15. The connector of claim 12, further comprising a first wire extending from the body and in electrical communication with the first terminal of the connector, and a second wire extending from the body and in electrical communication with the second terminal of the connector, the first and second wires configured to electrically communicate with the downstream device.

16. The receptacle assembly of claim 11, wherein each of the first and second terminals of the second set of terminals is a female terminal including a body, a beam, and a cut out on a first side of the beam.

17. The receptacle assembly of claim 16, wherein each of the first and second apertures includes a first end, a second end, and a bend between the first end and the second end, the bend being positioned adjacent the cut out of the respective first and second terminals of the second set of terminals.

18. The receptacle assembly of claim 17, wherein each of the first and second terminals of the connector are input terminals including a first end, a second end, and a bend between the first end and the second end, and wherein the first end, the second end, and the bend of each of the first and second terminals of the connector are complementary to the first end, the second end, and the bend of the respective first and second apertures.

19. The receptacle assembly of claim 11, wherein the receptacle assembly includes a core assembly positioned within the housing, the first terminal of the second set of terminals is positioned on a first side of the core assembly and the second terminal of the second set of terminals is positioned on a second side of the core assembly, wherein the first side is opposite the second side.

20. The receptacle assembly of claim 11, wherein the first terminal of the second set of terminals includes a first terminal leg and the second terminal of the second set of terminals includes a second terminal leg.

21. The receptacle assembly of claim 20, wherein the receptacle assembly includes a printed circuit board, the first terminal leg is configured to electrically couple the first terminal of the second set of terminals to the printed circuit board and the second terminal leg is configured to electrically couple the second terminal of the second set of terminals to the printed circuit board.

22. The receptacle assembly of claim 11, wherein the connector is a first connector and further comprising a second connector, the second connector being removably couplable to the housing to couple electric power to the receptacle, the first connector including a plurality of terminals, each of the plurality of terminals being complementary to one of the first set of terminals.

23. The receptacle of claim 10, wherein each of the first and second terminals is a female terminal including a body and a cut out on a first side of the body.

24. The receptacle of claim 23, wherein each of the first and second terminals is configured to receive an L-shaped terminal of a connector.

25. The receptacle of claim 10, wherein the first terminal includes a first terminal arm and the second terminal includes a second terminal arm.

26. The receptacle of claim 25, wherein the first terminal arm is configured to electrically couple the first terminal to a hot load contact and the second terminal arm is configured to electrically couple the second terminal to a neutral load contact.

* * * * *